United States Patent [19]
Doi et al.

[11] Patent Number: 5,186,387
[45] Date of Patent: Feb. 16, 1993

[54] APPARATUS FOR CONDITIONING AIR IN AUTOMOTIVE VEHICLE

[75] Inventors: Shigetoshi Doi; Tsutomu Fujiki, both of Hiroshima, Japan

[73] Assignee: Mazda Motor Corporation, Hiroshima, Japan

[21] Appl. No.: 739,427

[22] Filed: Aug. 2, 1991

[30] Foreign Application Priority Data

Aug. 2, 1990 [JP] Japan ................................ 2-206447
Jun. 24, 1991 [JP] Japan ................................ 3-178859

[51] Int. Cl.$^5$ .............................................. F24F 7/00
[52] U.S. Cl. ................................. 236/49.3; 454/315; 454/335
[58] Field of Search ................ 236/493; 454/315, 335

[56] References Cited

U.S. PATENT DOCUMENTS 2,086,022 7/1937 Feinberg ..................... 454/315 X
4,738,116 4/1988 Himeno et al. .............. 236/49.3 X

FOREIGN PATENT DOCUMENTS

0015008 1/1982 Japan ............................... 236/49.3
0059516 4/1984 Japan ............................... 236/49.3

Primary Examiner—John Rivell
Attorney, Agent, or Firm—Fish & Richardson

[57] ABSTRACT

Disclosed is an air-conditioning apparatus for an automotive vehicle so adapted as to allow its louvers disposed at air outlets for blowing or supplying air into the vehicle compartment to constantly assume their original positions when the louvers stop swinging. The swinging louvers are arranged to allow their directions in which the air is blown or supplied to be periodically changed by the swinging motor. The swinging motor is driven on the basis of a control signal from a control unit. A switching circuit of the swinging motor is provided with a first switch for being turned on or off on the basis of the signal from the control unit and with a second switch so arranged in parallel to the first switch and in association with the swinging motor as to be turned off when the swinging louvers are returned to their original positions.

18 Claims, 7 Drawing Sheets

APPARATUS FOR CONDITIONING AIR IN AUTOMOTIVE VEHICLE

BACKGROUND OF THE INVENTION

1. Field of the Invention

The present invention relates to an apparatus for conditioning air in an automotive vehicle and, more particularly, to an air-conditioning apparatus for an automotive vehicle, which is provided with a swinging louver at its air outlet for blowing air into the vehicle compartment.

2. Description of Related Art

Heretofore, there is known an air-conditioning apparatus for automotive vehicles and other vehicles, which has a swinging louver disposed at its air outlet so as to be swinging in a reciprocating way and changing the directions of air in a periodic way. Thus, this swinging louver can provide the passenger or passengers with a pleasant feeling of swaying air.

Japanese Patent Publication (kokoku) No. 48,621/1987 discloses an air-conditioning apparatus with such a swinging louver which is so arranged as to swing the swinging louver in accordance with the magnitude of the difference between a manually set compartment temperature required and an actual compartment temperature.

On the other hand, Japanese Patent Laid-open Publication (kokai) No. 57,018/1984 discloses an air-conditioning apparatus with a swinging louver so arranged as to swing the swinging louver in accordance with the quantity of blown air, i.e. a speed of the rotation of a blower.

Further, Japanese Utility Model Laid-open Publication (kokai) No. 81,411/1986 discloses a swinging louver so arranged as to start swinging when a manual switch is turned on and as to stop swinging when the manual switch is turned off. This swinging louver is arranged for its operation speed to be altered in accordance with the quantity of air-conditioning wind. More specifically, this system is arranged for the cycle of changes in the direction of air to be set shorter when a larger quantity of air is required to be supplied, for example, at the time when starting the air-conditioning operation because the air-conditioning state within the vehicle compartment is largely remote from the desired set temperature. This arrangement allows the passenger or passengers to get a wind directly from the air outlets of the air-conditioning apparatus at a higher frequency, thereby alleviating an unpleasant feeling to some extent.

However, in a conventional way of controlling the swinging louver, the operation of the swinging louver is started or suspended in accordance with the quantity of air-conditioning wind, the state of controlling air conditioning, etc. Hence, the direction in which the air is to be blown from the air outlet always varies with the timing at which the operation of the swinging louver is suspended. In other words, when the swinging louver suspends its swinging operation, there is no promise of the direction in which the air-conditioning wind is blown from the air-conditioning apparatus when the air-conditioning resumes because the directions of blowing the air are defined by the swinging louver which is disclosed at the air outlet of the air-conditioning apparatus at the time when the operation of the swinging louver is suspended. Accordingly, the conventional air-conditioning apparatus suffers from the difficulty that the passenger is required to adjust the direction of the swinging louver to direct the air-conditioning wind to a desired direction, whenever the swinging operation of the swinging louver is to be resumed.

SUMMARY OF THE INVENTION

Therefore, the object of the present invention is to provide an air-conditioning apparatus for an automotive vehicle so adapted as to allow its swinging louver to always assume its original position whenever the swinging operation of the swinging louver has been suspended.

In order to achieve the aforesaid object, the present invention consists of an air-conditioning apparatus for an automotive vehicle, comprising:

a swinging louver so disposed at an air outlet from which air is blown out as to define a direction in which the air is blown;

electrically driving means so disposed in association with the swinging louver as to periodically alter a direction in which the swinging louver is directed;

control-state detecting means for detecting a control state for the air;

first control means for turning the electrically driving means on or off in accordance with the control state of the air in response to a signal from the control-state detecting means; and second control means for delaying the electrically driving means to be turned off until the swinging louver is returned to its original position when the first control means turns the electrically driving means off.

The aforesaid arrangement allows the swinging louver to be returned to its original position whenever its swinging operation has been suspended. This is allowed by the disposition of the second control means which guarantees the operation of the swinging louvers until it returns to its original position and which permits the operation of the swinging louvers to be suspended for the first time when it returned to its original position.

Therefore, the present invention presents the advantage that the directions of the swinging louvers are not required to be adjusted wherever the air-conditioning apparatus resumes its operation, unlike the conventional systems, because the swinging louvers are always returned to their original positions when the swinging operation has been suspended.

Other objects, features and advantages of the present invention will become apparent during the course of the description of the preferred embodiments, which follows, with reference to the accompanying drawings.

DESCRIPTION OF THE PREFERRED EMBODIMENTS

The present invention will be described more in detail by way of examples with reference to the accompanying drawings.

FIRST EMBODIMENT (FIGS. 1-7)

Figure 1:
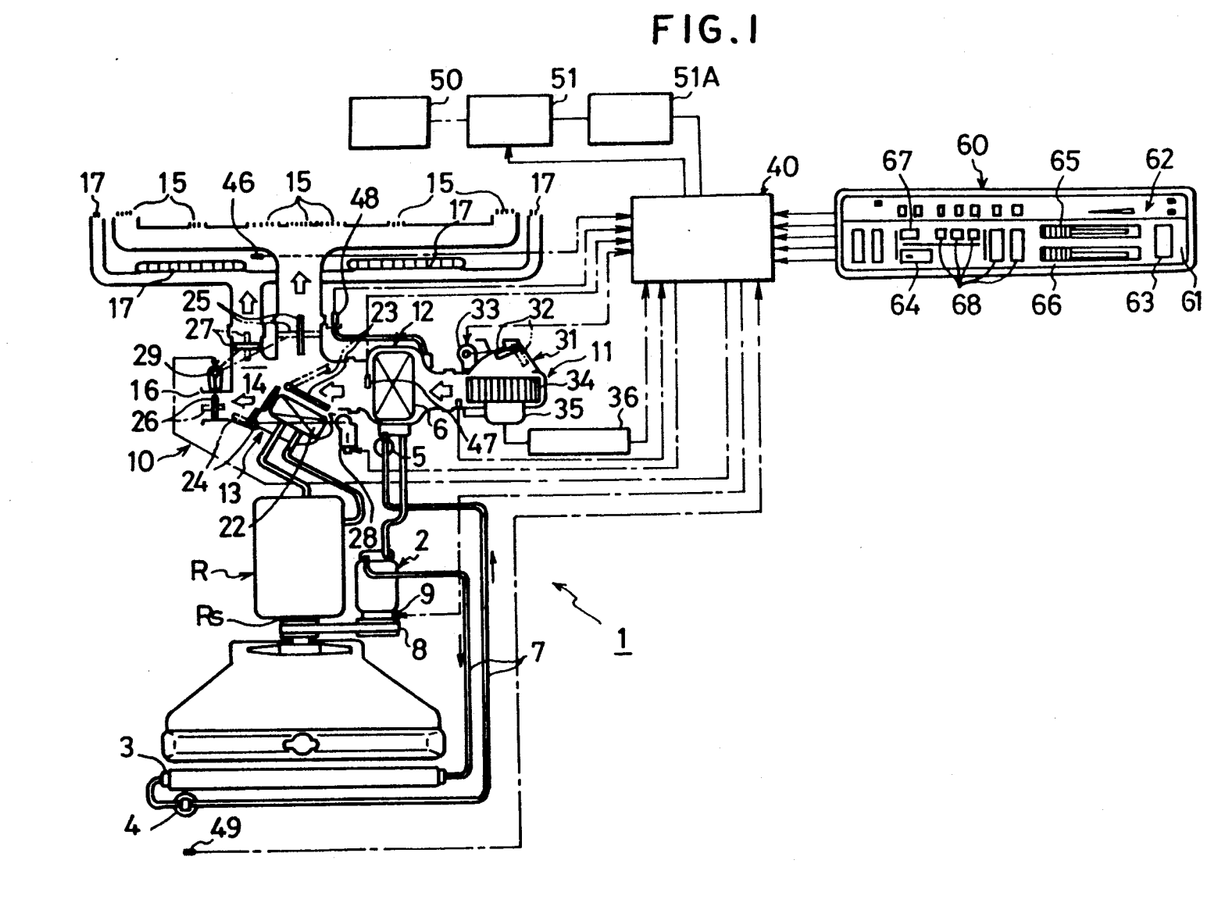
FIG. 1 is a schematic diagram showing an outline of the air-conditioning apparatus according to the present invention and an air-conditioning unit for controlling the air-conditioning state.

FIG. 1 shows the outlines of air-conditioning apparatus for an automotive vehicle and a control unit for controlling the air-conditioning states thereof.

As shown in FIG. 1, an air-conditioning device 1 comprises a compressor 2, a condenser 3, a receiver tank 4, an expansion valve 5, and an evaporator 6. These units and devices constitute the elements for a cooling cycle. The compressor 2 is connected to the condenser 3 through a pipe 7 which in turn connects the condenser 3 to the receiver tank 6. In FIG. 1, the arrows indicates the direction in which a coolant flows.

Then, the receiver tank 6 is connected to the expansion valve 5 through the pipe 7 and the expansion valve 5 is connected to the evaporator 6 through the pipe 7.

The compressor 2 is to compress the coolant and form a gaseous coolant of high pressure. The condenser 3 is to cool and condense the gaseous coolant by heat exchange with outside air, thereby forming a liquid coolant. The receiver tank 4 is to reserve the liquid coolant formed by the condenser 3. The expansion valve 5 is to adiabatically expand the liquid coolant. The evaporator 6 is to cool the surrounding air by the endothermic action resulting from evaporation and gasification of the adiabatically expanding liquid coolant. The air-conditioning device 1 having the aforesaid structure is known per se so that more description thereof will be omitted.

A driving shaft of the compressor 2 is connected to an output shaft Rs of an internal combustion engine R through power transmitting means 8, such as an electrically driving belt or the like, and an electromagnetic clutch 9. When the clutch 9 is coupled or turned on in a state in which the internal combustion engine R is being driven, the compressor 2 is operated while consuming a portion of the power of the engine R. On the other hand, when the clutch 9 is uncoupled or turned off, the compressor 2 is uncoupled from the engine R, thereby making the compressor 2 inoperative.

An air-conditioning control unit 40 is composed of, for example, a microcomputer consisting of a CPU, ROM, RAM, etc.

The electromagnetic clutch 9 is controlled by the control unit 40 so as to be shifted between a coupled (ON) state and an uncoupled (OFF) state.

An air-conditioning control unit 10 constituting a main body of the air-conditioning device 1 comprises a blower unit 11, a cooling unit 12, and a heater unit 13, and they are arranged in this order from the upstream side to the downstream side. The blower unit 11 is to take air into the air-conditioning control unit 10, and the cooling unit 12 is to cool the air by the evaporator 6. And the heater unit 13 is to warm the air by a heater core 22 using cooling water of the engine R as a heat source. The heater unit 13 is connected to an air-conditioning duct 14 for supplying the air into the vehicle compartment Each terminal of the air-conditioning duct 14 is communicated to each air outlet of a vent 15, a heater 16, and a defroster 17.

The heater unit 13 is constructed in a manner that the heater core 22 is interposed between two air mix doors 23 and 24, each of which is to adjust the quantity of air passing through the heater core 22 and thereby adjust the temperature of the air-conditioning wind. The air-conditioning duct 14 is provided with a vent door 25, a heater door 26, and a defroster door 27 in order to shift modes for blowing the air. Each of the air mix doors 23 and 24 is connected to a first motor 28, while each of the doors 25, 26 and 27 is connected to a second motor 29. The motors 28 and 29 are controlled by the control unit 40, and the first motor 28 and the second motor 29 are driven in accordance with control signals from the control unit 40, thereby adjusting a opening angle of each of the doors 23 to 27, inclusive, and controlling the temperature of the air and the blowing modes.

The blower unit 11 has an air intake box 31 for shifting to outside air intake mode, inner air circulation mode and inside-outside air intake mode and the air intake box 31 is provided with an inside-outside air shifting damper 32 which can shift the state of the air intake state to its outside air intake mode, its inside air circulation mode and its inside-outside air intake mode by pivoting the damper 32.

The outside air intake mode is to introduce fresh outside air into the vehicle compartment. The inside air circulation mode is to circulate the inside air in the vehicle compartment. The inside-outside air intake mode is to introduce both of inside air and outside air into the vehicle compartment.

The damper 32 is connected to a third motor 33 which allows the damper 32 to pivot, thereby assuming each of the outside air intake mode, inside air circulation mode, and inside-outside air intake mode.

The blower unit 11 is provided with a blower fan 34 on the downstream side of the air intake box 31, and the blower fan 34 is driven and rotated by a blower motor 35 whose rotation number in turn can be controlled by changing voltage Eb to be applied thereto. The voltage Eb of the blower motor 35 is controlled by the control unit 40. The quantity of air can be adjusted by controlling the rotation number of the blower motor 35.

In this embodiment, the blower motor 35 is provided with a blower voltmeter 36 for detecting the voltage Eb applied to the blower motor 35, and signals detected by the blower voltmeter 36 are supplied to the air-conditioning control unit 40. It is noted herein that the detection of the voltage Eb applied to the blower motor 35 can detect the rotation number of the blower motor 35, i.e. the quantity of air to be supplied to the vehicle compartment by the blowing fan 34.

The air-conditioning device 1 is a so-called automatic air conditioner having an automatic control function and an automatic mode function, and the control unit 40 for performing various control of the automatic air-conditioner is connected to an input instrument panel 60 for performing an input operation to the control unit 40.

The input instrument panel 60 is provided with an input section 61 and a display section 62, the former being to set an air-conditioning state to a desired state by the air-conditioning device 1 and the latter being to display the currently running state of the air-conditioning device 1. The input section 61 comprises a main switch 63 for turning the operation of the air-conditioning device 1 on or off, an automatic switch 64 for setting an automatic operation of the air-conditioning device 1, a fan lever 65 for manually setting the quantity of air, a temperature-setting lever 66 for setting the temperature (required temperature) Ts within the vehicle compartment, an inside-outside air shifting switch 67 for manually switching the air intake state to the inside air intake mode, the outside air circulation mode, and the inside-outside air intake mode, and a blowing-mode switch group 68 for manually setting an air blowing mode.

Figure 3:
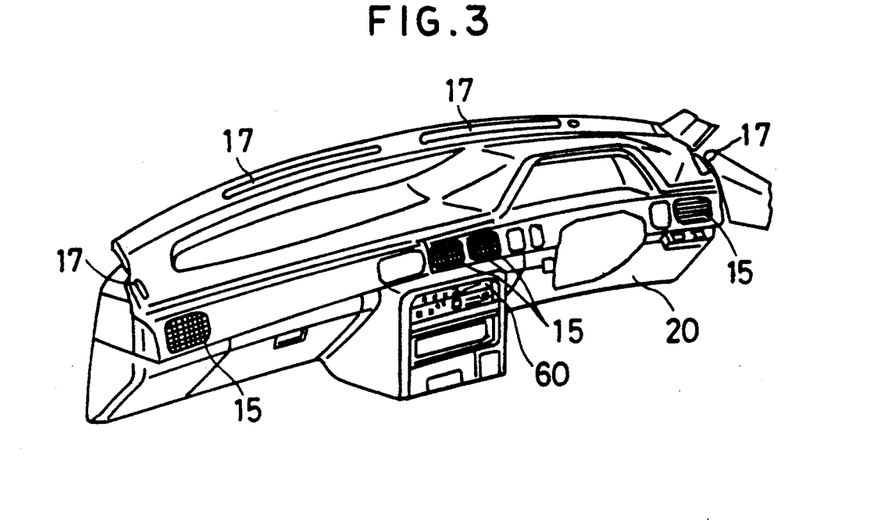
FIG. 3 is a perspective view showing an instrument panel having an air outlet with the swinging louver disposed therein.
Figure 4:
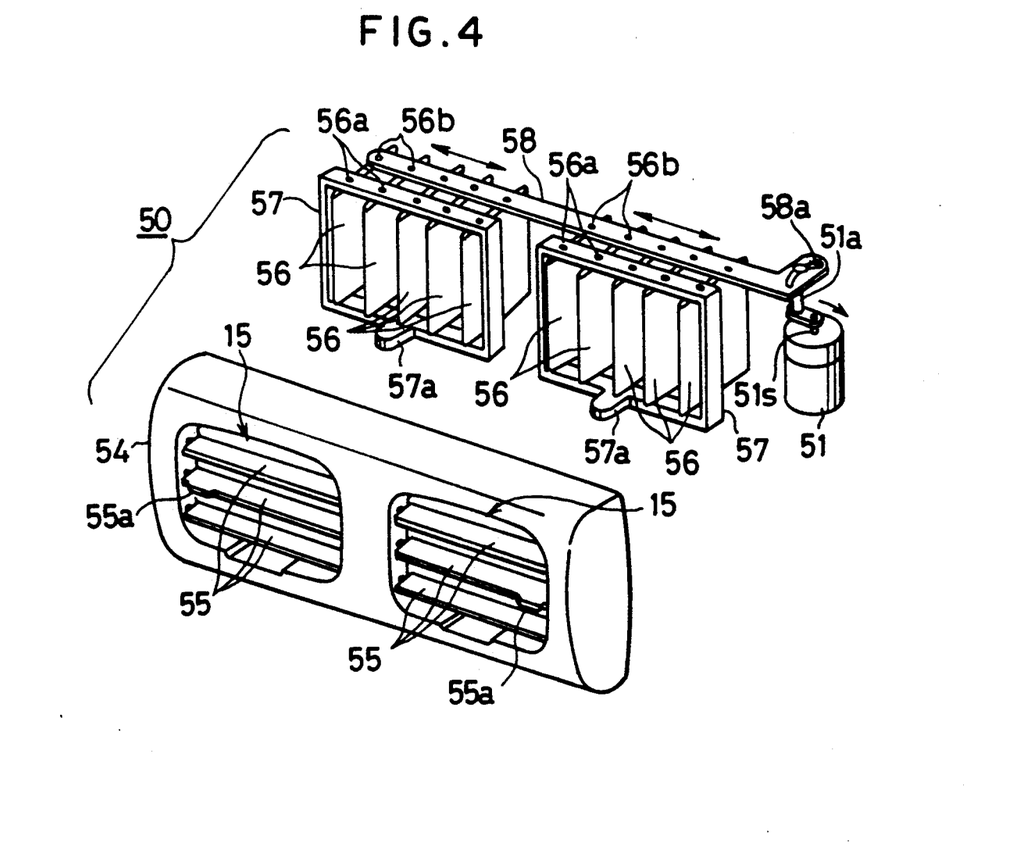
FIG. 4 is a decomposed perspective view showing the swinging louver.

In this embodiment, for example, as shown in FIG. 3, a plurality of outlets for &he vent 15 and for the defroster 17 on the upper portion of the instrument panel 20 are disposed at the front portion of the vehicle compartment. The outlets for the vent 15 are so arranged us to supply air toward the head and the upper body portion of the passenger and the outlets therefor are provided with a swinging louver unit 50 for changing the direction of air periodically. For example, as shown in FIG. 4, the swinging louvers unit 50 for the center air outlets of the vent 15 comprise plural transverse fins 55 so disposed in the nearly horizontal direction as to allow the air to be directed upwards or downwards, a casing 54 supporting the transverse fans 55 so as to be pivotable plural longitudinal fans 56 so disposed in the nearly vertical direction as to allow the air to be directed to the left or the right, and a frame member 57 supporting the longitudinal fans 56 so as to be pivotable on their vertical shafts 56a.

As shown in FIG. 1, each of the longitudinal fans 56 is further connected pivotably to a driving plate 58 disposed in a position apart from the vertical shaft 56a, which in turn is disposed extending in the direction in which the longitudinal fans 56 are arranged. The driving plate 58 has a cam groove 58a at its one end portion, through which an eccentric shaft 51a is inserted, and the eccentric shaft 51a is eccentrically mounted to an output shaft 51s of the swinging (electric) motor 51.

The foregoing arrangement allows the driving plate 58 to be moved alternately in left and right directions as the eccentric shaft 51a moves eccentrically by driving the swinging motor 51. Each of the longitudinal fans 56 is allowed to pivot concurrently on the corresponding vertical shaft 56a in association with the movement of the driving plate 58, thereby changing the direction of air from the vent outlets alternately and periodically in left and right directions.

On the other hand, the transverse fans 55 are provided with a first operating knob 55a for changing the direction of air in an upward or downward direction, and the manual operation of the first operating knob 55a allows a pivotal movement of the transverse fans 55 about their corresponding horizontal axes.

At a lower end portion of the frame member 57 is mounted a second operating knob 57a for changing the direction of air in a left or right direction, and the second operating knob 57a is manually operated to slide the frame member 57 to the left or right, thereby pivoting each of the longitudinal fans 56 on each of the corresponding vertical shafts 56b.

The swinging motor 51 is connected to the air-conditioning control unit 40 through a switching circuit 51A for driving or suspending the motor 51, and the switching circuit 51A is so arranged as to turn the swinging motor 51 on or off manually or automatically during the automatic operation of the air-conditioning device 1.

Figure 5:
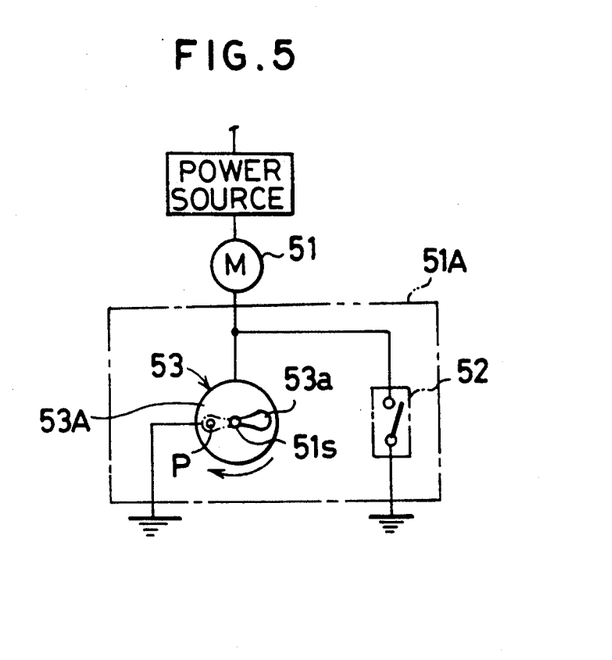
FIG. 5 is a switching circuit diagram of a swinging motor.

As shown in FIG. 5, the switching circuit 51A of the swinging motor 51 is provided with a first switch 52 and a second switch 53 which are disposed parallel to each other. The second switch 53 has a contact plate 53A that is pivotable in association with the swinging movement of the swinging louvers 50. The contact plate 53A is composed of a conductive material and it is of a flat disc shape with a hole 53a as a non-conductive portion. The contact plate 53A is connected at its center portion to the output shaft 51s of the swinging motor 51, thereby allowing the contact plate 53A to be rotated in association with the rotation of the motor 51. Hence, when the first switch 52 is turned off, the state is maintained in which electricity is applied to the swinging motor 51 until the hole 53a comes to the position in which it overlaps with the contact point P as indicated by the broken line in FIG. 5. In other words, the swinging motor 51 is suspended only when the hole 53a is located in the position is indicated by the broken line in FIG. 5, and the swinging louvers 56 are also suspended in the directions corresponding to the state of the swinging motor 51.

Hence, it is to be noted that the swinging centers of the swinging louvers 56, i.e. the direction thereof can be set to a particular desired one (for example, the direction toward the driver), when the operation of the swinging louvers 56 is suspended, by appropriately determining the relationship between the positions of the hole 53a and the contact point P, i.e. by adjusting the relationship between the positions of the hole 53a and the contact point P relative to the original position of each of the swinging louvers 56.

Figure 2:
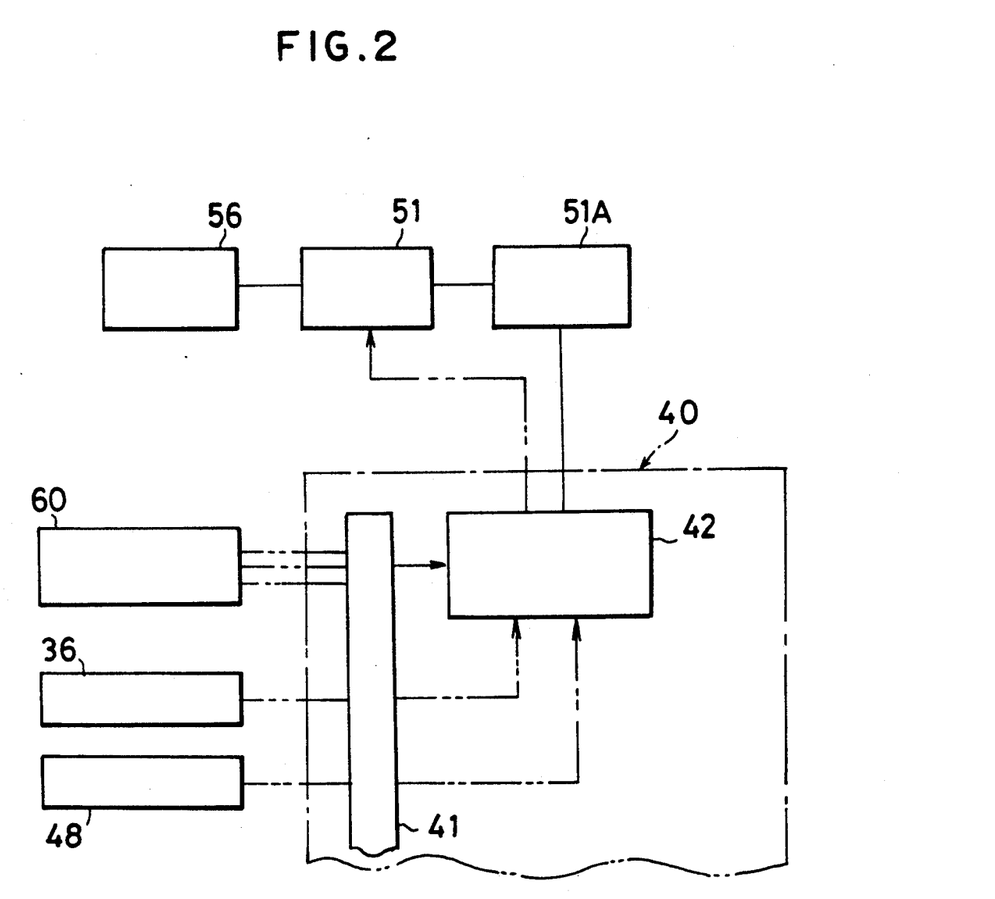
FIG. 2 is a block diagram showing a unit for controlling the swinging louver.

As shown in FIG. 2, in this embodiment, the air-conditioning control unit 40 has a swinging-louver control section 42 for controlling the operation of the swinging louvers 56. To the swinging-louver control section 42 are supplied through an input section 41 of the control unit 40 signals from the blower voltmeter 36, an in-car sensor 48 (FIG. 1) for sensing the actual temperature tr within the vehicle compartment, and each switch of the input instrument panel 60 (i.e. the automatic switch 64 and the blowing-mode switch group 68), and the swinging switch 52 is connected to the swinging-louver control section 42.

To the input section 41 of the control unit 40 are supplied signals from, among others, a solar-quantity sensor 46 (FIG. 1) for sensing the solar quantity, an evaporator sensor 47 for sensing mainly the temperature of the evaporator 6, and an outside-air temperature sensor 49 for sensing the temperature of air outside the vehicle body.

Description will now be made of the procedures for controlling the operation of the swinging louvers 56 by the swinging-louver control section 42 with reference to the flow chart of FIG. 7.

After the system has been started, at step S1, a decision is made to determine if the automatic switch 64 is turned on and the air-conditioning device 1 is automatically operated. When the result of decision at step S1 indicates that the air-conditioning device 1 is automatically operated, then the program flow goes to step S5 at which a decision is further made to determine if the blowing mode for supplying air is a vent mode, in which air is blown toward the head and the upper body portion of the passenger from the outlets of the vent 15, or a bi-level (B/L) mode, in which the air is blown from both of the outlets of the vent 15 and the heater 16.

When it is decided at step S5 that the blowing mode is neither the vent mode nor the B/L mode, it is unnecessary to drive the swinging louvers 56 so that the swinging motor 51 is not driven at step S13 to cause no driving of the swinging louvers 56.

On the other hand, when the result of decision at step S5 indicates that the blowing mode is either of the vent mode or the B/L mode, then the program flow goes to step S6 at which a decision is made to determine if the difference between the set temperature Ts of the air-conditioning device and the actual compartment temperature tr detected by the in-car sensor 48 is equal to or larger than a predetermined value To. When the result of decision at step S6 indicates that the difference is smaller than the predetermined value To, on the one hand, then the program flow goes to step S7 at which a decision is made to determine if the voltage Eb applied to the blower motor 35 is equal to or larger than a predetermined value Hi.

When it is decided at either of step S6 or step S7 that the decision result is in the affirmative, the program flow goes to step S13 at which the swinging motor 51 is suspended. In other words, the air-conditioning state within the vehicle compartment is far from the desired set state, i.e. the difference between the set temperature Ts and the actual compartment temperature tr is equal to or larger than the predetermined value To or the quantity of air is maintained at the predetermined value Hi, so that the operation of the swinging louvers 56 is suspended to thereby supply air in a concentrated manner to a particular passenger, e.g. the operator.

Figure 6:
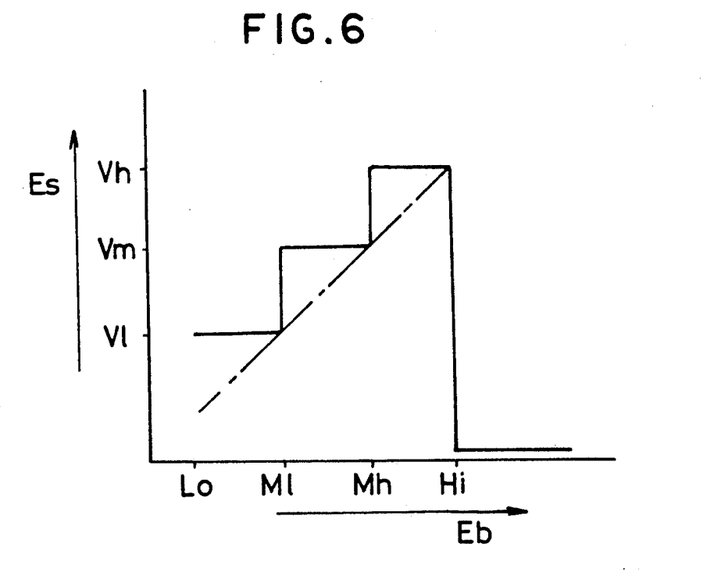
FIG. 6 is a graph showing the relationship between voltage to be applied to blower motor and voltage to be applied to a swinging motor.

On the other hand, when it is decided at both of step S6 and step S7 that the decision results are in the negative, the swinging louvers 56 are operated and swung. In this case, the speed at which the swinging louvers 56 are swung is made faster because the voltage Es to be applied to the swinging motor 51 becomes larger as the quantity of air becomes larger, i.e. as the voltage Eb applied to the blower motor 35 becomes larger, as shown in FIG. 6.

More specifically at step S8, a decision is made to determine if the voltage Eb applied to the blower motor 35 is equal to or larger than a predetermined value Mh that is set to be relatively high, followed by proceeding to step S10, when the result of decision at step S8 indicates that the voltage Eb is smaller than the predetermined value Mh, at which a decision is made to determine if the voltage Eb is equal to or larger than a predetermined value Ml that is set to be relatively low. And, when it is decided at both of step S8 and step S10 that the voltage Eb applied to the blower motor 35 is smaller than both of the predetermined values Mh and Ml, then the program flow goes to step S12 at which the voltage Es to be applied to the swinging motor 51 is set to e predetermined value V1 that is set to be relatively low. In this case, it is to be noted that the air-conditioning state is stable because the air is being supplied is at a low rate so that the cycle in which the swinging louvers 56 swing is set to be relatively long, thereby supplying the air in a stable fashion and providing the air within the vehicle compartment with a stable and swaying feeling.

On the other hand, when the result of decision at step S8 indicates that the voltage Eb applied to the blower motor 35 is equal to or larger than the relatively high and predetermined value Mh, the quantity of air to be blown from the blower motor 35 is so high that the program flow goes to step S9 at which the voltage Es to be applied to the swinging motor 51 is set to a relatively high level, Vh, thereby setting the rotation number of the swinging motor 51 to a relatively high level, i.e. shortening the swinging cycle of the swinging louvers 56, and allowing the passenger to get an air-conditioning wind directly from the air-conditioning system at a higher frequency.

Further, when it is decided at step S10 that the voltage Eb applied to the blower motor 35 is equal to or higher than the predetermined value M1, then the program flows goes to step S11 at which the voltage Es to be applied to the swinging motor 51 is set to an intermediate level, Vm. It can be noted herein that the voltage Es can be set continuously and linearly along the straight line as indicated by the dot-dash line in FIG. 6, in accordance with the voltage Eb to be applied to the blower motor 35, instead of changing the voltage Es in a stepwise manner.

When it is decided at step S1 that the air-conditioning device 1 is not automatically driven, then the program flow goes to step S2 at which a decision is made to determine if the mode other than the setting of the blowing mode is an automatic mode. When the result of decision at step S2 indicates that the mode involved is not the automatic mode, then the program flow goes to step S5 at which a decision is made to determine if the mode involved is the vent mode or the B/L mode.

On the other hand, when it is decided at step S2 that the mode other than the setting of the blowing mode is the automatic mode, the outlets for blowing air is chosen manually so that the program flow goes to step S3 at which a decision is made to determine if the air-conditioning state within the vehicle compartment is such a state as being set to the vent mode or the B/L mode when the air-conditioning device 1 is automatically driven. When it is decided at step S3 that the decision result is in the negative, no control over the swinging louvers 56 is needed because the air conditioning is performed to warm the air within the vehicle compartment, thereby suspending the operation of the swinging motor 51 at step S13.

When it is decided at step S3 that the decision result is in the affirmative, then the program flow goes to step S4 at which a decision is made to determine if the vent mode or B/L mode is actually specified by a mode switch 68 of the input instrument panel 60. When the result of decision at step S4 indicates that the selected mode is actually specified, on the one hand, then the program flow goes to step S6 at which the control over the swinging louvers 56 is executed. When the result of decision at step S4 indicates that the selected mode is not actually specified, on the other hand, then the program flow goes to step S13 at which the operation of the swinging motor 51 is suspended.

As described hereinabove, in the embodiment, the disposition of the swinging-louver controlling section 42 can allow the operation of the swinging louvers 56 to be suspended automatically without a laborious manual operation of the switches when the difference between the actual compartment temperature tr and the set temperature Ts is equal to or larger than the predetermined value To or when the quantity of air is equal to or larger than the predetermined value, i.e. when the air-conditioning state within the vehicle compartment is far from the desired set state at the time of starting the operation of the air-conditioning device 1.

Further, in this case, the direction in which the swinging louvers 56 are suspended can always be set automatically to a predetermined direction (for example, in the direction toward the operator), by the action of the contact plate 53A (i.e. the second switch 53).

As a consequence, the air-conditioning system can automatically make concentrated supply of air toward the passenger or passengers at the time of starting the air-conditioning, when the air-conditioning state within the vehicle compartment is remote from the desired set state, thereby avoiding an unpleasant feeling of the passenger or passengers at the time when the air-conditioning is started.

When the swinging louvers 56 is operated, the cycle in which the direction of blowing air is changed is made shorter when the difference between the air-conditioning state within the vehicle compartment and the desired set state is relatively large, while the cycle of changing the direction of blowing air is made longer when the difference between them is relatively small. This arrangement can provide the passenger or passengers with a more improve pleasant feeling during the operation of the swinging louvers 56.

It is noted herein that the foregoing description is directed to an automatically air-conditioning system, however, the air-conditioning system according to the present invention can likewise be applied to air-conditioning systems for general vehicles where the air-conditioning state is set basically by manual operation.

Figure 8:
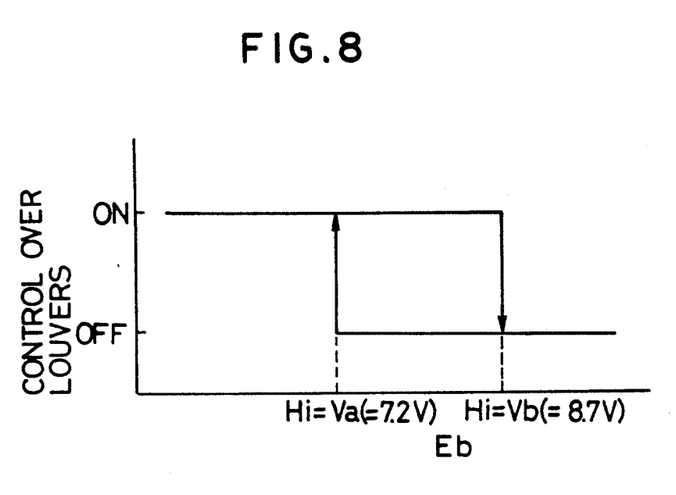
FIG. 8 is a graph showing the control contents according to a second embodiment of the present invention.
Figure 9:
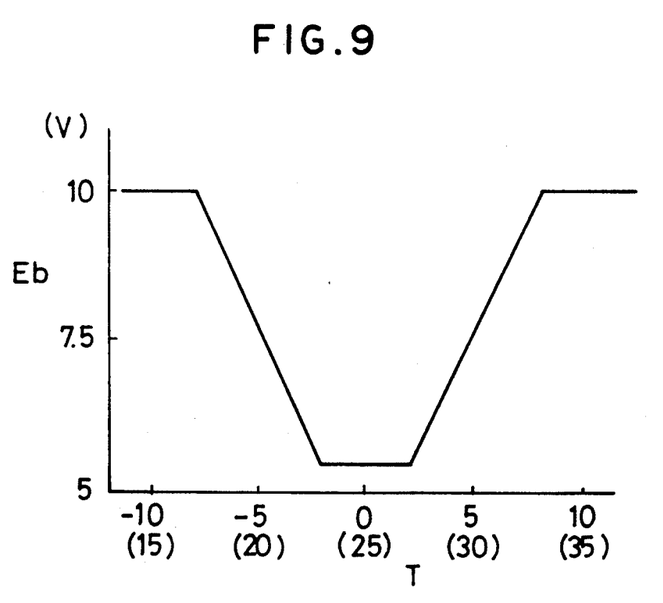
FIG. 9 is a graph showing the contents of automatic control over the quantity of air-conditioning wind.
Figure 10:
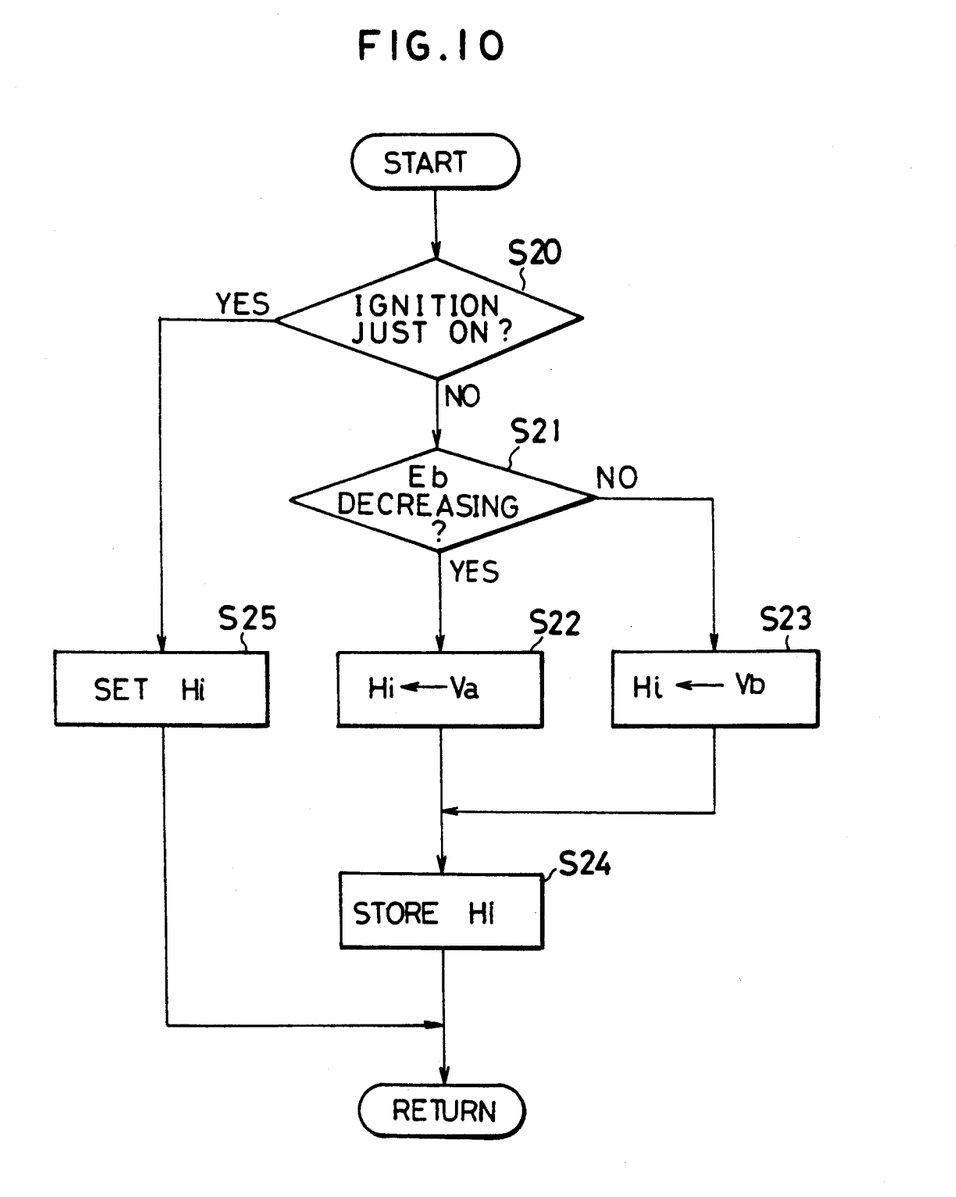
FIG. 10 is a flow chart showing a control example of the second embodiment of the present invention.

SECOND EMBODIMENT (FIGS. 8-10)

Figure 7:
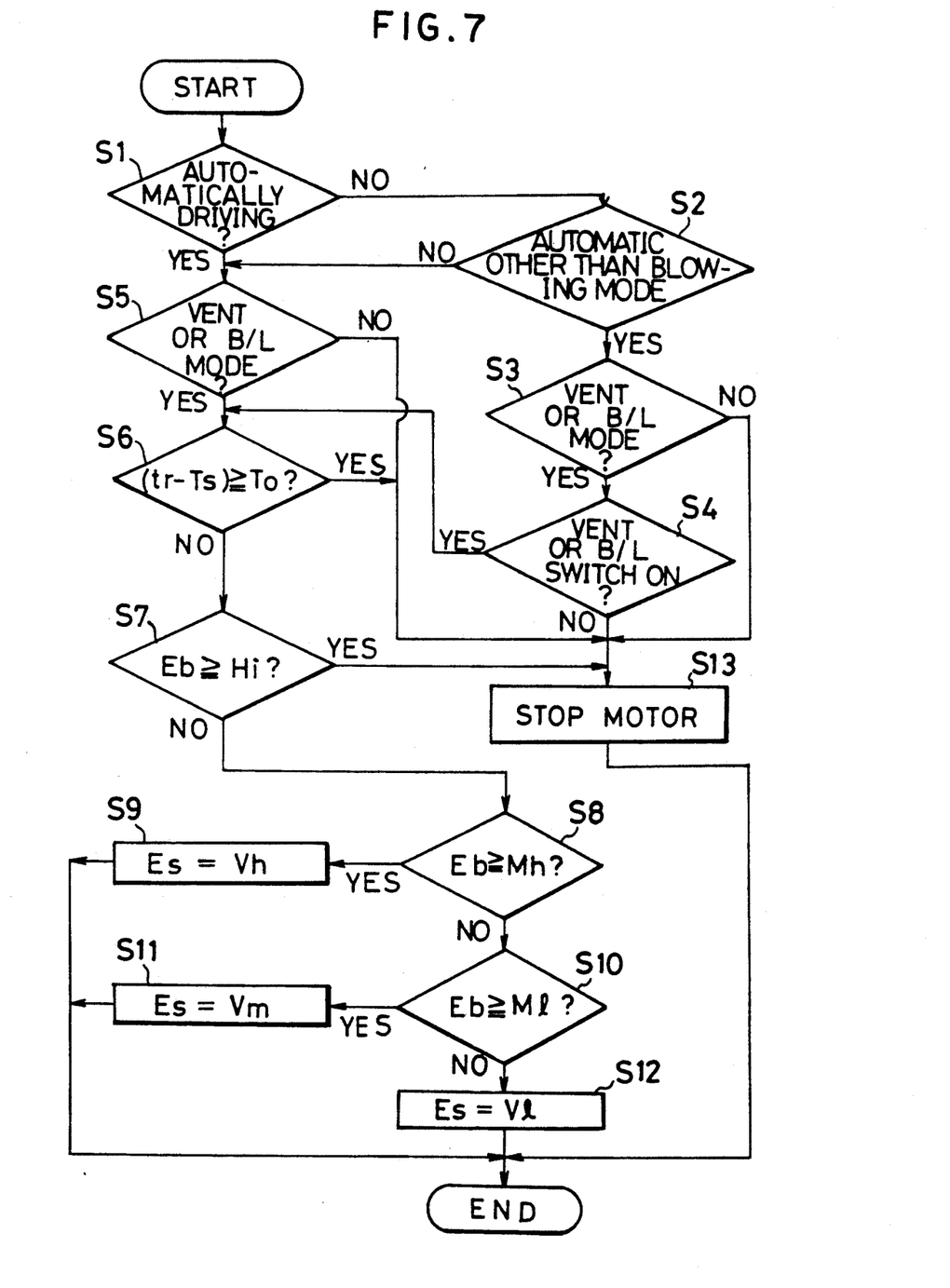
FIG. 7 is a flow chart showing an example of control over the operation of the swinging louver.

In this embodiment, as shown in FIG. 8, a hysteresis is provided so as to alter a threshold value for executing the control over the operation of the swinging louvers 56, i.e. the determination value (threshold value), Hi, as indicated at step S7 in FIG. 7, when the voltage Eb to be applied to the blower motor 35 is increasing or decreasing.

The control over the blower motor 35, i.e. over the voltage Eb to be applied to the blower motor 35, is performed on the basis of a comprehensive signal T. In other words, the air-conditioning control unit 40 computes the comprehensive signal T by the following formula, and the voltage Eb to be applied to the blower motor 35 is controlled on the basis of the comprehensive signal T.

$$T=(tr-25)+\alpha(ta-25)+\beta(td-12)-\gamma(Ts-25)$$

where
tr is the temperature within the vehicle compartment;
ta is the temperature of outside air;
td is the temperature within an air-conditioning duct 14;
Ts is the set temperature within the vehicle compartment (the set temperature); and
$\alpha$, $\beta$ and $\gamma$ are each a correction coefficient.

It is noted herein that the correction coefficients, $\alpha$, $\beta$ and $\gamma$, are determined by demonstration tests because their optimum values may vary with the air-conditioning system and the vehicle characteristics.

It is further tr be noted that the comprehensive signal T means a deviation between the required temperature Ts set manually by the instrument panel 60 and the actual compartment temperature tr, and the deviation is corrected by the temperature of outside air, etc. in order to optimize the deviation.

Description will now be made of the contents of the control over the blower motor 35 to be made by the air-conditioning control unit 4(. It is to be noted first that the large absolute value of the comprehensive signal T means the large difference between the actual compartment temperature, tr, and the set temperature, Ts and the voltage Eb to be applied to the blower motor 35 is made to the maximum level and the quantity of air to be blown into the vehicle compartment is set to a "strong" state, thereby making the difference between the temperatures (the deviation thereof) rapidly and enhancing the air-conditioning capacity to the maximum level.

As the room temperature tr is approaching to the set temperature Ts and the air-conditioning capacity is being stored, the voltage Eb to be applied to the blower motor 35 is gradually lowered at a predetermined gradient and the quantity of air to be blown into the vehicle compartment is made smaller continuously. And the voltage Eb is lowered to the lowest voltage when the value of the comprehensive signal T is approaching to zero, i.e. in a stable period when each of the compartment temperature to and the set temperature Ts becomes equal to or lower than a predetermined value, thereby allowing the quantity of air to be blown into the vehicle room to be kept at a faint or weak rate. FIG. 9 shows the contents of the control as described hereinabove.

It is noted herein that the figures between the parentheses in FIG. 9 mean the corresponding compartment temperatures when the temperature of outside air is 25° C., the set temperature is 25° C. and the duct sensor is at 12° C.

Given the foregoing, the contents of the control over the alteration of the threshold value Hi will specifically be described with reference to the flow chart as shown in FIG. 10.

After the system has been started by turning an ignition key switch (not shown) on, a decision is made at step S20 to determine if the ignition key switch has been turned on immediately before this decision. When it is decided at step S20 that the result of decision at step S20 is in the negative, i.e. when it is decided that the time longer than a predetermined period of time has been elapsed from the time when the engine has been started, then the program flow goes to step S21 at which a decision is further made to determine if the voltage Eb to be applied to the blower motor 35 is incipiently decreasing. When the result of decision at step S22 indicates that the voltage Eb is incipiently decreasing, then the program flow goes to step S22 at which a first predetermined value Va is set as the threshold value Hi. On the contrary, when it is decided at step S21 that the voltage Eb is rather incipiently increasing, then the program flow goes to step S23 at which a second predetermined value Vb is set as the threshold value Hi. It is noted herein that the first predetermined value Va is set to be smaller than the second predetermined value Vb. In this embodiment, the first predetermined value Va is set to 7.2 V and the second predetermined value Vb is set to 8.7 V, as shown in FIG. 8.

Then, at step S24, the latest threshold value Hi set at step S22 or step S23 is stored in memory means (not shown) built in the air-conditioning control unit 40.

On the other hand, when it is decided at step S20 that the engine has been ignited immediately beforehand, i.e.

the ignition key switch has been just turned on, then the program flow goes to step S25 at which the threshold value Hi stored in the memory means is set.

On the basis of the threshold value Hi set at step S22, S23 or S25, a decision is made at step S7 in FIG. 7 to determine if the control over the swinging louvers 56 is executed at steps S8 through S12.

In other words, the varying threshold value Hi is set when the voltage Eb to be applied to the blower motor 35 is incipiently decreasing or increasing, i.e. the threshold value Hi is set to the first predetermined value Va when the voltage Eb is incipiently decreasing or the threshold value Hi is set to the second predetermined value Vb when the voltage Eb is incipiently increasing, so that the risk of frequently repeating the execution and the suspension of the control over the swinging louvers 56 can be avoided.

It is to be noted herein that, when only one value is set as the threshold value Hi and the voltage Eb to be applied to the blower motor 35 is changed in the vicinity of the threshold value Hi, the execution and suspension of the control over the swinging louvers 56 are caused to be repeated frequently. It is further noted herein that the voltage Eb to be applied to the blower motor 35 has the characteristic likely to be subject to a variation in the temperature of outside air, etc.

Further, in this embodiment, the threshold value Hi which has been currently stored is set immediately after the ignition key switch was turned on, as shown at step S25 in FIG. 10, i.e. the threshold value Hi existing immediately before the ignition key switch is turned off is set as the threshold value Hi immediately after the ignition key switch was turned on. Therefore, when the period of time when the operation of the engine has been suspended is short, an unpleasant feeling of the passenger or passengers can be avoided.

In other words, as the state of the swinging louvers 56 immediately before the suspension of the operation of the engine is continued even after a resumption of the operation of the engine, the passenger or passengers is or are provided with a feeling as if the control over the swinging louvers 56 would have been continued, regardless of the temporary suspension of the operation of the engine, when the period of time is short from the time when the ignition key switch was turned off to the time when it is turned on again. This effect is achieved particularly when the voltage Eb to be applied to the blower motor 35 immediately after the ignition key switch was turned on exists between the two threshold values, i.e. Hi=Va and Hi =Vb.

It is to be understood that the foregoing text and drawings relate to embodiments of the present invention given by way of examples but not limitation. Various other embodiments and variants are possible within the spirit and scope of the present invention.

What is claimed is:

1. An air-conditioning apparatus for an automotive vehicle, comprising:
    a louver disposed at an air outlet for defining a direction in which air is supplied to a vehicle compartment;
    electrically driving means disposed in association with the louver for electrically driving the louver so as to periodically alter a direction of the louver;
    control-state detecting means for detecting an air-conditioning control state of an air-conditioning device;
    first control means for turning the electrically driving means on or off in accordance with the air-conditioning control state thereof in response to a signal from the control-state detecting means; and
    second control means for delaying the time at which the electrically driving means is turned off until the louver is returned to its original position when the first control means turns the electrically driving means off.

2. An air-conditioning apparatus as claimed in claim 1, wherein:
    a switching of the electrically driving means is provided with a first switch and a second switch which are arranged parallel to each other;
    the first switch is turned on or off in response to a signal from the first control means; and
    the second switch is arranged in association with the electrically driving means as well as turned off when the louver is returned to its original position and the second switch is turned on when the louver is located in a position other than its original position.

3. An air-conditioning apparatus as claimed in claim 2, wherein:
    the second switch comprises a conductive member so disposed as to be pivotable in association with the electrically driving means and a fixed contact so disposed as to slidably come into contact with the conductive member;
    the conductive member comprises a non-conductive section which comes into contact with the fixed contact when the louver is returned to its original position and a conductive section which comes into contact with the fixed contact when the louver is located in a position other than its original position.

4. An air-conditioning apparatus as claimed in claim 3, wherein:
    the electrically driving means is an electric motor; and
    the conductive member constituting the second switch is of a flat disc shape and an output shaft of the electric motor is fixed to a central portion of the conductive member in a flat disc shape.

5. An air-conditioning apparatus as claimed in claim 4, wherein:
    the flat disc-shaped conductive member is provided with a hole section which constitutes the non-conductive section.

6. An air-conditioning apparatus as claimed in claim 1, further comprising:
    operational-speed altering means for altering an operational speed at which the electrically driving means is operated, in accordance with the air-conditioning control state, in response to a signal from the control-state detecting means, when the electrically driving means is turned on.

7. An air-conditioning apparatus as claimed in claim 6, wherein:
    the control-state detecting means comprises air-quantity detecting means for detecting a quantity of air for air conditioning; and
    the operational-speed altering means is to alter the operational speed of the electrically driving means in response to a signal from the air-quantity detecting means so as to allow the operational speed of the electrically driving means to become faster when the quantity of air therefor is larger than when the quantity of air therefor is smaller when the electrically driving means is turned on.

8. An air-conditioning apparatus as claimed in claim 1, wherein:
the control-state detecting means comprises air-quantity detecting means for detecting a quantity of air for air conditioning; and
the first control means turns the electrically driving means off in response to a signal from the air-quantity detecting means when the quantity of air therefor is larger than a predetermined threshold value and turns the electrically driving means on when the quantity of air therefor is smaller than the predetermined threshold value.

9. An air-conditioning apparatus as claimed in claim 8, wherein:
the electrically driving means is an electric motor; and
the air-quantity detecting means is to detect the quantity of air for air conditioning on the basis of voltage to be applied to the electric motor.

10. An air-conditioning apparatus as claimed in claim 1, wherein:
the first control means further comprises first determining means for determining if the electrically driving means is turned on or turned off, as a result of comparison between a value indicative of the air-conditioning control state and a predetermined threshold value;
detecting means for detecting a change in the air-conditioning control state;
second determining means for determining if the change in the air-conditioning control state is incipient for turning the electrically driving means on or for turning the electrically driving means off, in response to a signal from the detecting means; and
threshold-value setting means for setting a first threshold value as the threshold value when the change in the air-conditioning control state is incipient for turning the electrically driving means on and for setting a second threshold value as the threshold value when the change in the air-conditioning control state is incipient for turning the electrically driving means off, in response to a signal from the second determining means.

11. An air-conditioning apparatus as claimed in claim 10, wherein:
the control-state detecting means comprises air-quantity detecting means for detecting a quantity of air for air conditioning;
the first control means turns the electrically driving means off when the quantity of air therefor is larger than a predetermined threshold value and turns the electrically driving means on when the quantity of air therefor is smaller than the predetermined threshold value, in response to a signal from the air-quantity detecting means;
the detecting means comprises detecting means for detecting the change in the quantity of air; and
the second determining means for setting a first threshold value which is relatively larger, as the threshold value, when the quantity of air changes in a direction in which the quantity of air increases, and for setting a second threshold value which is relatively smaller, as the threshold value, when the quantity of air changes in a direction in which the quantity of air decreases, in response to a signal from the detecting means for detecting the change in the quantity of air.

12. An air-conditioning apparatus as claimed in claim 11, wherein:
the electrically driving means is an electric motor; and
the air-quantity detecting means detects the quantity of air on the basis of voltage to be applied to the electric motor.

13. An air-conditioning apparatus as claimed in claim 1, further comprising:
means for detecting a temperature within a vehicle compartment for detecting an actual temperature within the vehicle compartment;
means for manually setting a temperature required to be set within the vehicle compartment;
automatically controlling means for automatically controlling a control state of an air-conditioning device in accordance with the difference between the actual compartment temperature and the manually set temperature required, in response to signals from the means for detecting the temperature within the vehicle compartment and the means for manually setting the temperature required to be set within the vehicle compartment.

14. An air-conditioning apparatus as claimed in claim 13, wherein the automatically controlling means is to automatically control the temperature of air to be blown into the vehicle compartment.

15. An air-conditioning apparatus as claimed in claim 13, wherein the automatically controlling means is to automatically control the quantity of air.

16. An air-conditioning apparatus as claimed in claim 13, wherein the first control means turns the electrically driving means off when the difference between the actual compartment temperature and the manually set temperature required is larger than a predetermined threshold value, and turns the electrically driving means on when the difference between them is smaller than the predetermined threshold value, in response to the signals form the means for detecting the temperature within the vehicle compartment and the means for manually setting the temperature required to be set within the vehicle compartment.

17. An air-conditioning apparatus as claimed in claim 13, wherein:
the air-conditioning state detecting means comprises means for detecting the quantity of air for air conditioning;
and the first control means turns the electrically driving means off when the difference between the actual compartment temperature and the manually set temperature required is larger than a predetermined threshold value for the threshold value and the quantity of air is larger than a predetermined threshold value for the quantity of air therefor, and turns the electrically driving means on when the difference between them is smaller than the predetermined threshold value for the threshold value and the quantity of air therefor is smaller than the predetermined threshold value for the quantity of air thereof, in response to the signals form the means for detecting the temperature within the vehicle compartment and the means for manually setting the temperature required to be set within the vehicle compartment.

18. An air-conditioning apparatus as claimed in claim 1, wherein the louver disposed at an air outlet of a vent is driven by the electrically driving means.

* * * * *